United States Patent
Helbing et al.

(10) Patent No.: US 6,853,778 B2
(45) Date of Patent: Feb. 8, 2005

(54) OPTICAL MODULE WITH ALIGNMENT WAVEGUIDE

(75) Inventors: Rene P. Helbing, Palo Alto, CA (US); Kenneth R. Wildnauer, Santa Rosa, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 28 days.

(21) Appl. No.: 10/246,308

(22) Filed: Sep. 18, 2002

(65) Prior Publication Data

US 2004/0052464 A1 Mar. 18, 2004

(51) Int. Cl.[7] .................................................. G02B 6/30
(52) U.S. Cl. ........................................ 385/49; 385/97
(58) Field of Search ............................. 385/49–52, 97

(56) References Cited

U.S. PATENT DOCUMENTS

| | | | |
|---|---|---|---|
| 5,046,808 A | | 9/1991 | Chang |
| 5,359,687 A | * | 10/1994 | McFarland et al. ............ 385/49 |
| 5,533,156 A | * | 7/1996 | Maxwell et al. ............... 385/49 |
| 5,600,745 A | * | 2/1997 | Wuu et al. ..................... 385/49 |
| 5,854,868 A | * | 12/1998 | Yoshimura et al. ............ 385/50 |
| 6,157,759 A | * | 12/2000 | Seo et al. ....................... 385/49 |
| 6,300,151 B1 | | 10/2001 | Yoon et al. |
| 6,316,281 B1 | | 11/2001 | Lee et al. |
| 6,782,170 B2 | * | 8/2004 | Stayt et al. .................... 385/52 |

\* cited by examiner

*Primary Examiner*—Mark Tremblay (57) ABSTRACT

The optical module optically aligns two adjacently located optical components. The optical module comprises a substrate and at least one pre-alignment groove formed therein for coarsely aligning the two optical components. The optical components are seated in the at least one groove with a gap between them. The optical module further comprises a waveguide core located in the gap between the two optical components. The waveguide core extends from a light-guiding portion of one optical component to a light-guiding portion of the other optical component and guides light from one optical component to the other.

28 Claims, 8 Drawing Sheets

OPTICAL MODULE WITH ALIGNMENT WAVEGUIDE

TECHNICAL FIELD OF THE INVENTION

The present invention is generally related to integrated optical systems. More particularly, the present invention is related to systems and methods for optically aligning separate optical components with each other.

BACKGROUND OF THE INVENTION

In the field of optics, manufacturers of optical modules may choose to integrate planar optical components with non-planar components. For example, many passive optical components, such as optical waveguides, may be formed on a planar substrate. The planar substrate may be further configured to physically support active optical components, such as laser diodes. However, active optical components typically cannot be easily formed on these planar substrates based on waveguide technology. Typically, active optical components have to be added in a separate step. The technology involved in forming passive and active optical components on a substrate is typically called hybrid integration.

In order to maximize the amount of light transmitted through the optical system, the manufacturer attempts to align a component with an adjacent component in the optical system so that light energy is not lost at the junctions between components. The solution for aligning adjacent components in the prior art involves physically moving the components with respect to each other until an optimum alignment is reached. In particular, light is transmitted through a fixed component while the other component is moved with respect to the fixed component. A light sensor measures the light energy received at the moveable component at different positions until an optimal light level is reached at a particular position. At this point, the components are secured by an adhesive material to avoid movement of one component relative to the other.

One inadequacy of the prior art solution is that the components may be inadvertently moved during the step of applying the adhesive material. Since a force is applied to the components during the application of the adhesive material, any displacement caused by the force may result in an undesirable misalignment. Furthermore, after the application of adhesive material, the components may experience physical forces that slightly alter the position of the components with respect to each other. With the use of extremely small optical components, the change in position on the order of a few microns may cause a significant loss in light transmission, thereby degrading the optical system.

Another inadequacy of the prior art alignment methods is that the process involved in physically moving components by slight incremental movements, measuring, re-measuring at more locations, and locating the optimum position for alignment can be an expensive and time-consuming procedure. Thus, a need exists in the industry to address the aforementioned perceived deficiencies and inadequacies.

SUMMARY OF THE INVENTION

The present disclosure defines methods and systems for aligning optical components in an optical module and methods of manufacturing an optical module. The optical module optically aligns optical components adjacently located within an optical system. The optical module includes a substrate and at least one groove formed in the surface of the substrate for pre-aligning the optical components. The optical module further includes a waveguide core that extends from a light-guiding portion of one optical component to a light-guiding portion of the other optical component.

The waveguide core is formed on the substrate and extends from one optical component to the other to guide light between the optical components more effectively than the prior art solutions. The custom waveguide core overcomes the deficiencies of the prior art by taking into account any misalignment between the coarsely-aligned optical components.

Other systems, methods, features, and advantages of the present invention will be apparent to one having skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Like reference numerals designate corresponding parts throughout the several views.

DETAILED DESCRIPTION OF THE INVENTION

The present disclosure applies to the field of optics, optical modules, and optical systems wherein light and other types of radiation are conveyed along pre-determined paths. The term "optical" used herein may also refer to electro-optical systems. Disclosed are optical modules and methods of manufacturing such optical modules in which a custom waveguide is fabricated to guide light between two optical components. The manufacturing method includes a pre-alignment process of forming grooves within a substrate for providing a coarse pre-alignment of the two optical components. The pre-alignment process uses one or two grooves that accept and coarsely align the optical components. With the components pre-aligned by the pre-alignment grooves, a second portion of the process configures and fabricates a waveguide core that guides light across a gap between the two optical components. The waveguide core is shaped to account for residual mis-alignment of the optical components and transmits light from one optical component to the other.

The waveguide core is formed by applying a waveguide layer to the surface of the substrate. The waveguide layer may be added before grooves are formed in the substrate and the optical components are pre-aligned. In an alternative embodiment, the waveguide layer is added after a single groove has been formed in the substrate and the optical components have been pre-aligned. The unwanted portions of the waveguide layer are removed so that only the waveguide core remains. The unwanted portions may be removed by any number of techniques. For example, a positionally-controlled laser may be utilized to emit light waves to the unwanted portions. Alternatively, an electron or light beam may be applied to remove the unwanted portions. Other techniques may be used to remove the unwanted portions and to form the waveguide core between the optical components. The waveguide core is created with a shape that directs a maximum amount of light from one optical component to another, thereby providing fine alignment of the adjacent optical components. Additionally, a cladding material may be applied to the waveguide core to enhance light-guiding and for protection.

Figure 1:
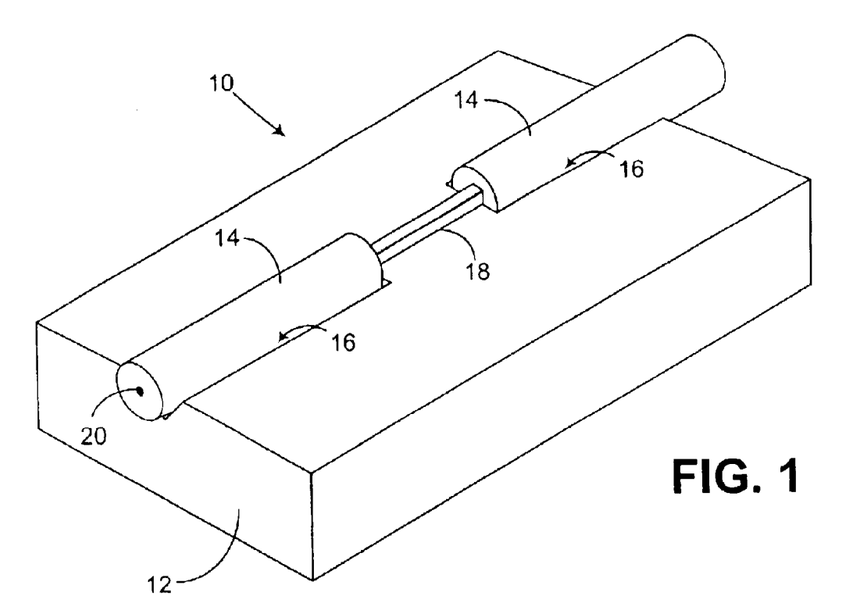
FIG. 1 is a perspective view illustrating an embodiment of an optical module in accordance with the present invention having a waveguide core formed between optical components.

FIG. 1 illustrates a perspective view of an embodiment of an optical module 10 according to the present invention. The optical module 10 shown in FIG. 1 has a substrate 12 that supports optical components 14. The substrate 12 is formed with one or more grooves 16 in which the optical components 14 are seated. The grooves 16 are formed such that the seated optical components 14 are coarsely pre-aligned.

More particularly, the grooves 16 are formed such that the light-guiding portions 20 of the optical components 14 are axially-aligned. When the external topologies of the two optical components 14 differ or when the optical axes of the light-guiding portions 20 of the two optical components 14 are offset, the grooves 16 are formed to minimize the mis-alignment. The grooves 16 in this case are formed separately with different physical dimensions to account for the topological differences of the optical components 14. Thus, when optical components 14 having axially-offset light-guiding portions 20 are seated in the grooves 16, the differences in the physical dimensions of the grooves 16 compensate for the offset and coarsely pre-align the two optical components 14.

It should be noted that the grooves 16 may incidentally be formed having some degree of error, causing a slight mis-alignment of the optical components 14. Furthermore, the optical components 14 themselves may be slightly deformed such that an axis of the optical components placed in the grooves 16 are not parallel to the axes of the grooves 16. This too will result in an undesirable misalignment between the optical components. Another cause of misalignment may be an optical component 14 improperly seated within the groove 16. Regardless of the cause of misalignment, a waveguide core 18 is formed between the optical components 14 in accordance with the present invention in order to correct any misalignment and to maximize the amount of light transmitted from one component to another. The waveguide core 18 extends from the light-guiding portion 20 of one optical component 14 to the light-guiding portion 20 of the other optical component 14. Illustrated in FIGS. 2–14 are exemplary embodiments showing manufacturing processes involved in creating the optical module 10 of FIG. 1.

Figure 2:
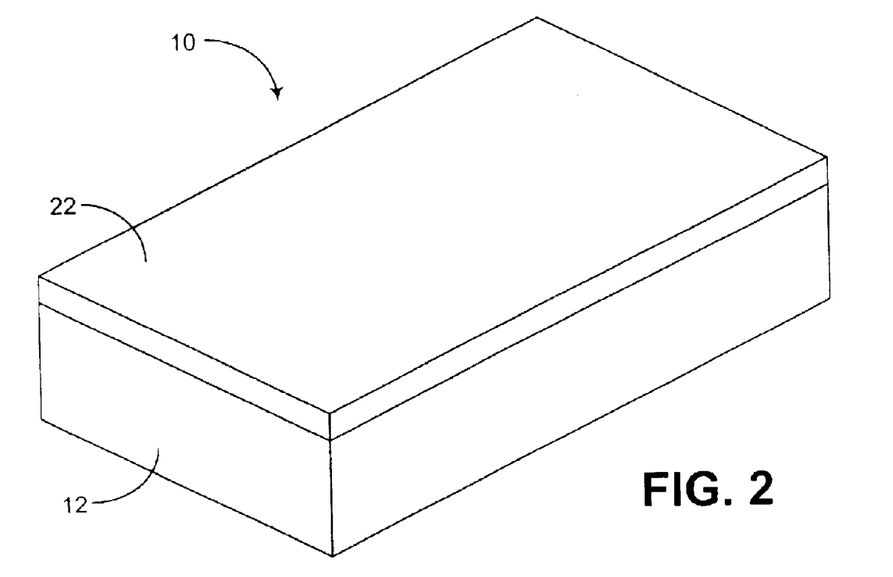
FIG. 2 is a perspective view of an exemplary embodiment of an optical module in accordance with the present invention during a manufacturing procedure.

FIG. 2 is a perspective view of an embodiment of an optical module 10 in accordance with the present invention for aligning two optical components in an optical module. The optical module 10 of FIG. 2 is shown in the beginning stages of manufacture. The optical module 10 includes a substrate 12 composed of a material for providing support for an overlying layer. The substrate 12 is composed of a material that is relatively rigid and that has a relatively low coefficient of thermal expansion, such as silicon, ceramic, glass, plastic, etc.

The substrate 12 supports a waveguide layer 22, which is affixed to the substrate 12. The embodiment of FIG. 2 illustrates the waveguide layer 22 affixed during the early stages of manufacturing. However, in other embodiments, the waveguide layer 22 may be added at a later stage. In one embodiment, the waveguide layer 22 is composed of a transparent material having efficient light-transmitting properties. The transparent waveguide layer 22 is preferably a material such as PMMA, polyimide or other transparent plastic, depending on the wavelength of the transmitted light. To form the waveguide core 18 shown in FIG. 1, portions of the transparent waveguide layer 22 shown in FIG. 2 that are not meant to be part of the waveguide core itself are removed. The remaining portions of the waveguide layer 22 constitute the waveguide core 18.

Alternatively, the waveguide layer 22 may comprise a photosensitive material. The photosensitive material has a refractive index that changes when exposed to light. The exposed region changes such that light is guided through the exposed portion of the waveguide layer. The refractive index of the unexposed region remains unchanged such that it confines the light to the waveguide portion. To form a waveguide core from the photosensitive waveguide layer 22, the waveguide region of the photosensitive waveguide layer 22 is exposed to light.

Figure 3:
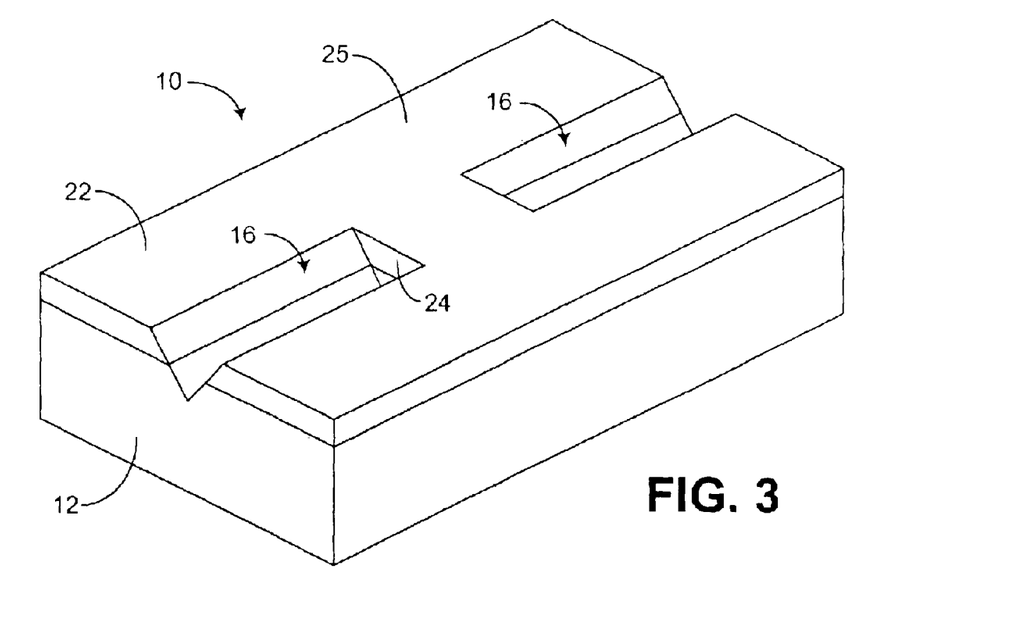
FIG. 3 is a perspective view of the exemplary embodiment of the optical module shown in FIG. 2 during the manufacturing procedure.

FIG. 3 is a perspective view of an embodiment of the optical module 10 during a manufacturing process after the grooves 16 are formed. FIG. 3 illustrates an embodiment wherein the light-guiding portions 20 of the optical components 14 have identical axes. If the axes are offset, the grooves are formed to account for the offset as mentioned above. When the light-guiding portions 20 are symmetrical, the grooves 16 are formed such that a long axis of one groove 16 is aligned with a long axis of the other groove 16. The grooves 16 may be formed by an etching technique, laser ablation, or other alternative material-removing technique. The grooves 16 may have a V-shaped cross-sectional shape, as illustrated in FIG. 3, or may alternatively be formed having any desirable cross-sectional shape, such as, for example, a rectangular or semi-circular cross-sectional shape. The size and shape of the grooves 16 depends on the physical size and shape of the optical components 14 to be aligned. The grooves 16 are formed having a size and depth such that, when an optical component is placed in one of the grooves 16 and light is transmitted from the optical component 14, the light remains within the plane of the waveguide layer 22.

The grooves 16 are further formed having an alignment face 24 that is orthogonal to a plane of a top surface 25 of the waveguide layer 22 and orthogonal to the long axis of the grooves 16. The term "top surface" is used herein to refer to a surface of layers or substrates oriented as shown in the drawings. However, it should be understood that the "top surface" may actually be a side surface or a bottom surface if the optical module 10 is oriented in space in a manner that is different from the orientation shown.

The alignment face 24 has a surface against which an optical component 14 is abutted when the optical component 14 is inserted in the groove 16. Preferably, the alignment face 24 is shaped similarly to the shape of the end of the optical component 14, thus providing more positive and repeatable alignment. Shaping the alignment face 24 similarly to the end may additionally prevent stray particles from entering the space between the optical component 14 and the alignment face 24, thus interfering with the transmission of light.

Figure 4:
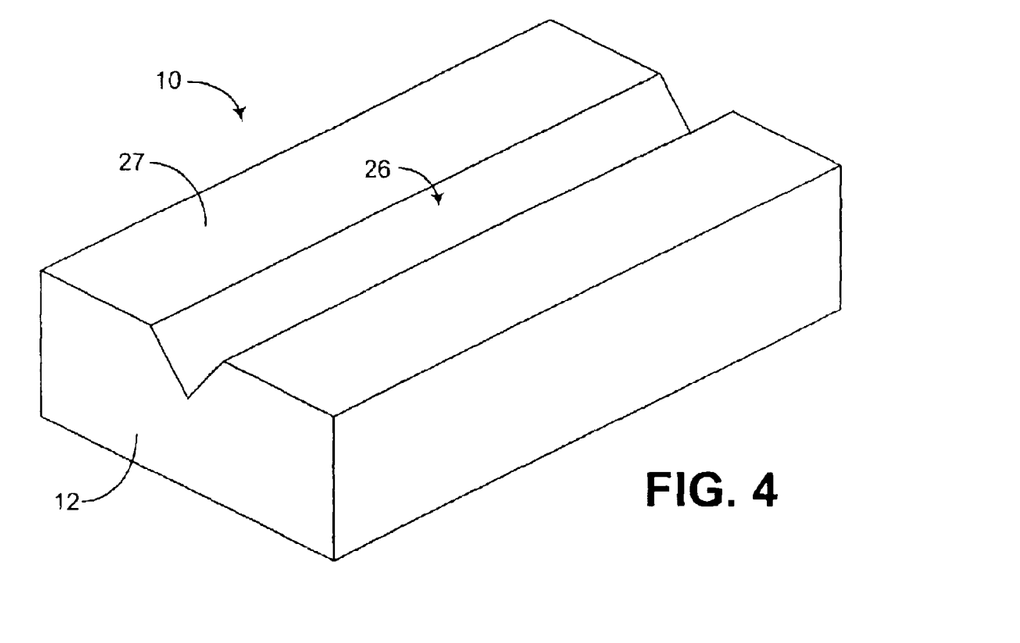
FIG. 4 is a perspective view of an exemplary embodiment of an optical module during a manufacturing procedure.

FIG. 4 is a perspective view of an embodiment of the optical module 10 in which a single groove 26 is formed in the substrate 12. In this embodiment, as suggested above, the groove 26 is formed in the substrate 12 before a waveguide layer is affixed to the substrate 12. The single groove 26 formed in the substrate 12 has any desirable shape. The groove 26 has a depth such that, when optical components 14 are placed within the groove 26, the light-guiding portions 20 of the optical components 14 lie entirely below a top surface 27 of the substrate 12.

In this embodiment, the waveguide layer 22 is applied to the substrate 12 at a later time in the manufacturing process, after the optical components have been coarsely pre-aligned on the substrate 12. In this case, the waveguide layer 22 more easily fills the gap between the optical components and provides a continuous path from one optical component to the other. The continuous path lacks undesirable gaps between the optical components and the waveguide layer 22.

Figure 5:
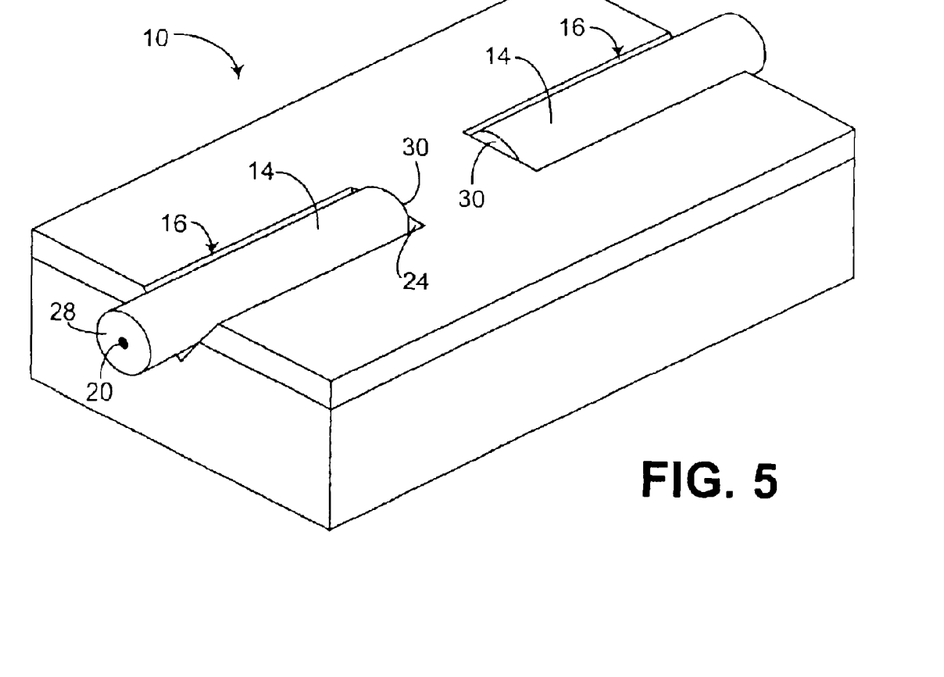
FIG. 5 is a perspective view of the optical module shown in FIG. 3 after the optical components have been inserted.

FIG. 5 is a perspective view of the optical module 10 of FIG. 3, in which the optical components 14 are seated within the grooves 16. As an example, the optical components 14 are shown as optical fibers, each having a light-guiding portion 20 and a protective portion 28. The optical components 14 may be other optical components such as waveguides, laser diodes, photo-detectors, etc. that are to be aligned within the optical module 10.

Each optical component 14 is inserted within a respective groove 16 such that an end 30 of the optical component 14 faces the opposite component and abuts the alignment face 24. If the optical component 14 does not have a face that is orthogonal to the axis of the optical component 14, then the respective groove 16 may be formed such that the alignment face 24 conforms to the shape of the end 30 of the optical component 14 or a portion of the end 30. When the optical components 14 are placed in the grooves 16, the light-guiding portions 20 are directed toward each other through the interposed portion of the waveguide layer 22. At this stage, the optical components 14 are coarsely pre-aligned so that a substantial amount of light is transmitted between the optical components 14.

The optical components 14 are secured within the grooves 16 using an adhesive material, solder, or other suitable fixing material. A force-applying fixture (not shown) may be used to press the optical component 14 into the groove 16 until the fixing material takes hold. At this stage, the two optical components 14 are secured to the substrate 12 and are coarsely pre-aligned with each other. The waveguide core 18, illustrated in FIG. 1, will be formed, as described below, to provide finer alignment to achieve greater light reception efficiency.

Figure 6:
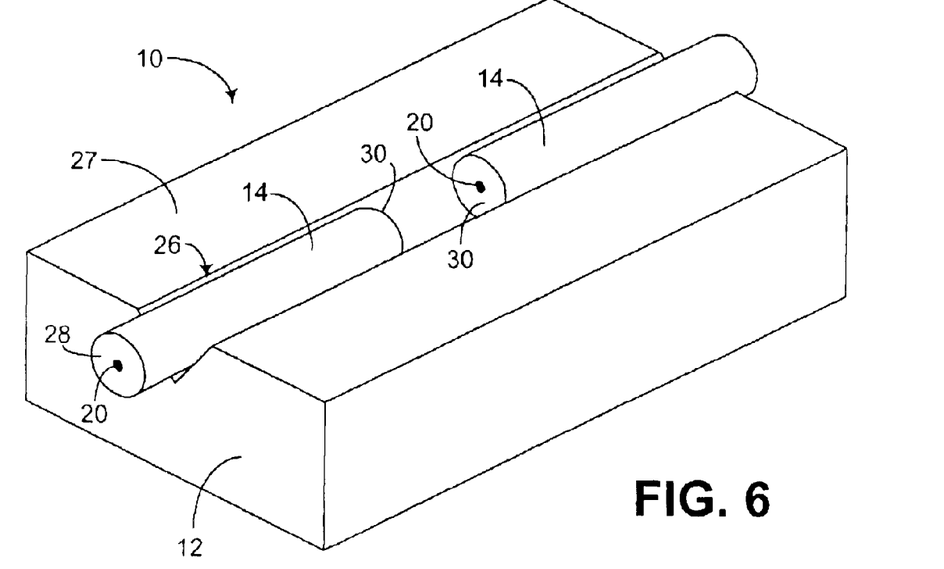
FIG. 6 is a perspective view of the optical module shown in FIG. 4 after the optical components have been inserted.

FIG. 6 illustrates the embodiment of FIG. 4 in which a waveguide layer is added after the optical components 14 have been inserted and secured within the groove 26. When the optical components 14 are secured within the groove 26, the waveguide layer is added to at least a section of the substrate located between the ends 30 of the optical components 14. The waveguide layer extends from at least an end 30 of an optical component 14 to an end 30 of the other optical component 14. The width of the waveguide layer 22 is at least as wide as the light-guiding portions 20 of the optical components 14.

In this alternative embodiment, it may be desirable if the two optical components 14 are identical or similar to form the groove transversing the length of the substrate 12. A single groove enhances the pre-alignment of identical optical components 14 since the optical components 14 are placed in the same groove. With the optical components 14 pre-aligned in this configuration, the waveguide layer 22 may be added by filling part of the single groove between the ends 30 of the optical components 14 with the waveguide material. In this case, it may also be desirable to form a deep groove as shown in FIG. 6 so that the light-guiding portions 20 lie entirely below the top surface 27 of the substrate 12.

Figure 7:
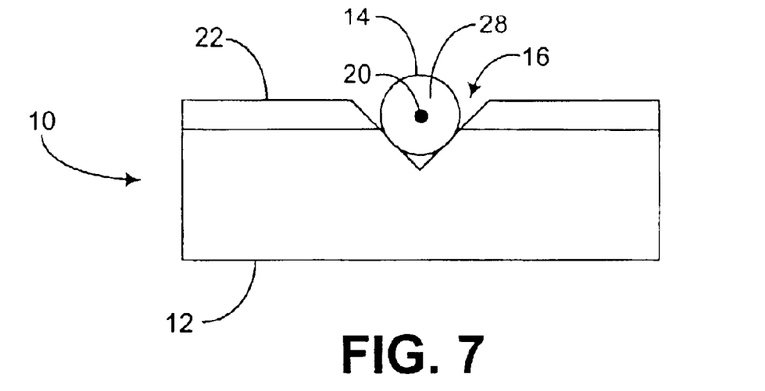
FIG. 7 is a front view of an exemplary embodiment in accordance with the present invention of an optical module having grooves with a V-shaped cross-section.

FIG. 7 illustrates a front view of the optical component 14 placed in the groove 16 of the optical module 10 of FIG. 5. It should be emphasized that the depth and dimensions of the groove 16 are such that the light-guiding portion 20 is entirely within the plane of and approximately centered within the thickness of the waveguide layer 22. When the light-guiding portion 20 is centered, light transmitted from the light-guiding portion 20 travels through the waveguide layer 22 to the other optical component 14. It should further be emphasized that the groove 16 is formed according to the external topology of the protective portion 28 as well as the location of the light-guiding portion 20 within the optical component 14. The thickness of the waveguide layer 22 is approximately equal to the size of the light-guiding portion 20 of the optical component 14 and is preferably at least as great as the size of the light-guiding portion 20. The thickness of the waveguide layer 22 may be based on the tolerance necessary to account for directional or positional misplacement or misalignment of the optical components 14. If the optical component 14 is positioned with a slight mis-orientation within the groove 16, then the waveguide layer 22 is formed sufficiently thick to avoid a significant loss of transmitted light.

Figure 8:
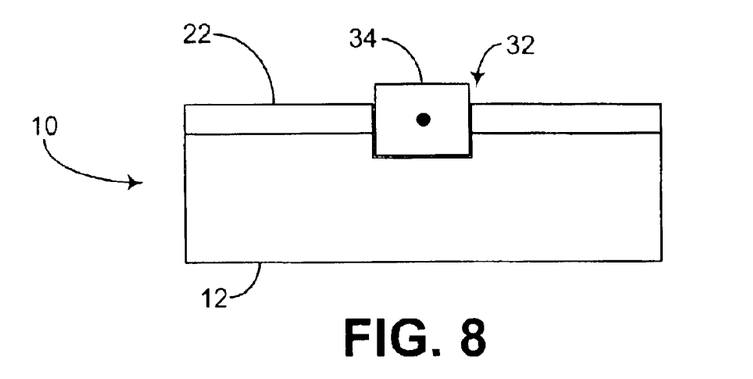
FIG. 8 is a front view of an exemplary embodiment in accordance with the present invention of an optical module having grooves with a rectangular cross-sectional shape.

FIG. 8 illustrates a front view of the optical module 10 including a groove 32 having a rectangular cross-sectional shape. This shape may be advantageous to support an edge-emitting laser diode 34 or other similarly-shaped components having a substantially rectangular die shape.

Figure 9:
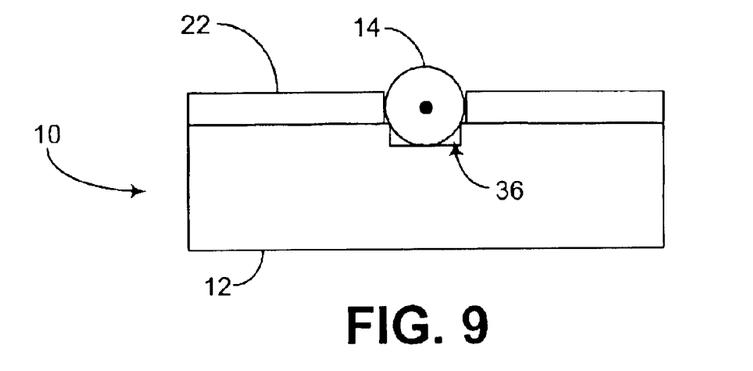
FIG. 9 is a front view of an exemplary embodiment in accordance with the present invention of an optical module having grooves with a step-like rectangular cross-sectional shape.

FIG. 9 illustrates a front view of the optical module 10 including a rectangular stepped groove 36 shaped such that the waveguide layer 22 contains an opening equal in size to a circular cross-sectionally shaped optical component 14 or an odd-shaped component. The groove 36 contains a smaller rectangular opening within the substrate 12 so that the optical component 14 seats properly on the substrate 12. Therefore, when portions of the waveguide layer 22 are removed, the corner edges of the substrate 12 adequately position the optical component 14.

Figure 10:
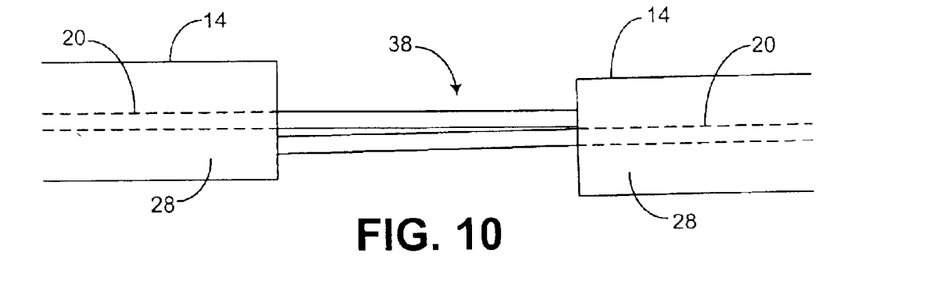
FIG. 10 is a top view of a section of the optical modules of FIG. 5 or 6 illustrating misalignment of optical components before a waveguide core is fabricated.

FIG. 10 illustrates a top view of portions of the facing optical components 14, in which the light-guiding portions 20 are shown in phantom. The optical components 14 are shown with a lateral misalignment. Beams of light 38 from the individual optical components 14 are shown such that no part of the beam is transmitted from one component to the other. The misalignment is exaggerated in order to illustrate the function of the optical module 10. Typically, the pre-alignment achieved by placing the optical components 14 in the grooves 16 provides a course pre-alignment having a misalignment that is less severe than illustrated. A custom waveguide core that is formed in a shape that guides light from one optical component 14 to the other compensates for the misalignment shown in FIG. 10. For example, the waveguide may be a straight light-conducting path extending from the center of the end of the light-guiding portion 20 of one optical component 14 to the center of the facing end of the light-guiding portion 20 of the other optical component 14.

Figure 11:
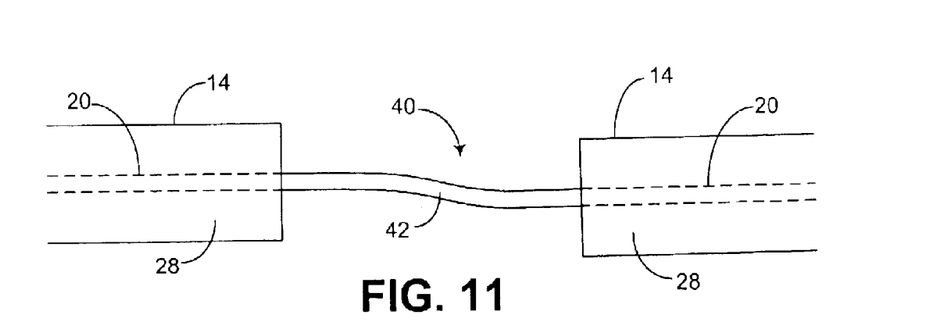
FIG. 11 is a top view of the section of the optical modules of FIG. 5 or 6 after a waveguide core is fabricated to correct the misalignment of FIG. 10.

FIG. 11 shows an embodiment of a waveguide core 40 having an "S" shaped light-conducting path. The waveguide core 40 starts in a direction aligned with the path that a beam of light would take entering or leaving the light-guiding portion 20 of one optical component 14 and ends in a direction aligned with the path that a beam of light would take when entering or leaving the light-guiding portion 20 of the other optical component 14. The middle section 42 of the waveguide core 40 joins the two end sections. This middle section 42 curves in a sinuous path in one direction and then another. Preferably, the middle section 42 is designed with large radii of curvature to reduce the amount of light lost between the optical components 14. Other waveguide shapes may be formed in order to reduce the loss of light energy between the components.

Figure 12:
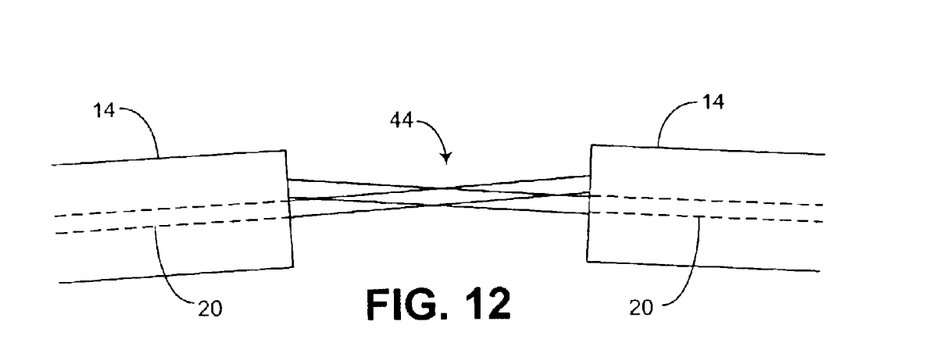
FIG. 12 is a top view of a section of the optical modules of FIG. 5 or 6 illustrating another misalignment of the optical components before a waveguide core is fabricated.

FIG. 12 shows another example of component misalignment, in which the optical components 14 are angularly mis-aligned. Light beams 44 emitted from the light-guiding portions 20 cross paths in this misalignment. Again, the degree of misalignment is typically not as great as shown, but the misalignment shown is exaggerated for the purpose of illustration. In this case, a waveguide core correcting such misalignment may be straight or "C" shaped.

Figure 13:
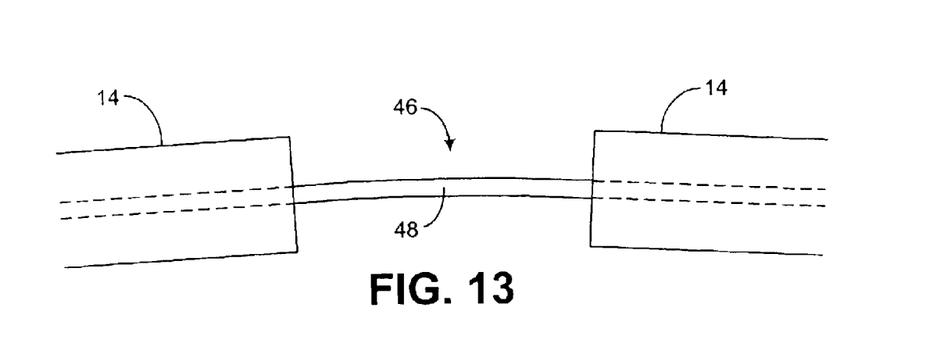
FIG. 13 is a top view of the section of the optical modules of FIG. 5 or 6 after a waveguide core is fabricated to correct the misalignment of FIG. 12.

FIG. 13 illustrates an example of a C-shaped waveguide core 46 that corrects the misalignment shown in FIG. 12. The C-shaped waveguide core 46 is shaped such that it starts in the direction aligned with the path that a beam of light would take entering or leaving the light-guiding portion 20 of one optical component 14 and ends in the direction aligned with the path that a beam of light would take entering or leaving the light-guiding portion 20 of the other optical component 14. A middle section 48 curves once to join the end sections and optically connect the optical components 14.

Figure 14:
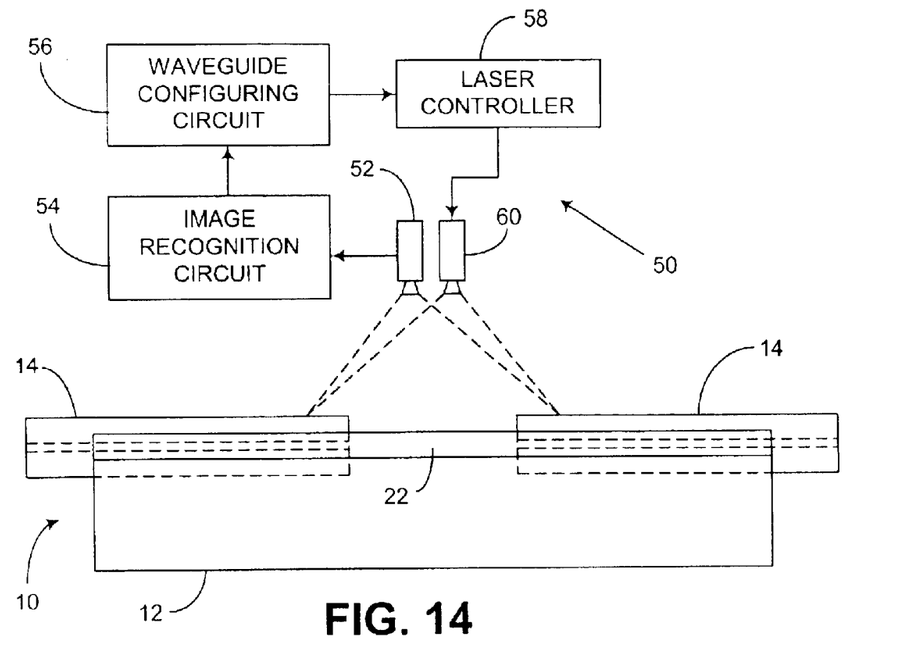
FIG. 14 is a partial side view and block diagram illustrating an exemplary embodiment of a waveguide-forming apparatus and an optical module in accordance with the present invention.

FIG. 14 is a side view of the optical module 10 of FIG. 5 and a partial schematic diagram illustrating an exemplary embodiment of a waveguide forming apparatus 50 in accordance with the present invention. The waveguide forming apparatus 50 defines an alignment waveguide in the waveguide layer 22 by removing or otherwise changing portions of the waveguide layer 22 to form a waveguide core that transmits light from one optical component 14 to another.

The waveguide forming apparatus 50 is made up of an image-capturing device 52 for capturing an image of the region at least between the ends 30 of the optical components 14. The image-capturing device 52 may include a camera or other type of optical detecting device and may include charge coupled devices (CCDs), for example. The image-capturing device 52 may be configured to additionally view a region around the ends 30 of each of the optical components 14. Image data representing the image received by the image-capturing device 52 is transmitted to an image recognition circuit 54. The image recognition circuit 54 analyzes the image data from the image-capturing device 52 to determine the physical features of each optical component 14, the light patterns emitted from the optical components 14, or both.

The image recognition circuit 54 may be programmed to identify structural features of the optical components 14. For example, the image recognition circuit 54 may recognize the external dimensions or physical features of the optical components 14 to determine any misalignment of the components. Alternatively, the image recognition circuit 54 may recognize alignment marks located on the top or sides of the optical components 14. The alignment marks indicate the direction of a beam of light entering or leaving the optical component 14. The alignment marks also indicate the position at which the beam of light enters or leaves the optical component 14.

The image recognition circuit 54 may be configured in another alternative embodiment to recognize light patterns in the image data. In this embodiment, a light source (not shown) is connected to an outside end of one of the optical components 14 to transmit light therethrough. The optical component 14 transmits a beam of light in the direction of the other optical component 14. The image-capturing device 52 may capture an image of the misalignment of one of the beams of light 38 or 44 shown in FIG. 10 or 12. The image recognition circuit 54 detects the location of the light beam and determines the starting point and direction of the beam of light from one of the optical component 14. A second light source (not shown) may be connected to an outside end of the other optical component 14, and the image recognition circuit 54 detects the starting point and direction of the other light beam transmitted through the other optical component 14.

When an active optical component, such as a laser diode, is to be aligned according to this embodiment, the active optical component may be activated to emit the light that is detected by the image-capturing device 52. In this embodiment involving active optical components, the image-capturing device 52 may capture an image of one of the light beams 38 or 44 shown in FIGS. 10 and 12, respectively. The image recognition circuit 54 recognizes the location and direction of the light beam. When both beams are imaged, the beams are emitted one at a time. Signals from the image recognition circuit 54 are output to a waveguide configuring circuit 56, which utilizes the signals from the image recognition circuit 54 to determine the best location and shape of a waveguide core for optically aligning the optical components 14.

From the signals output from the image recognition circuit 54, the waveguide configuring circuit 56 determines the dimensions and location of the waveguide core to be created. The waveguide configuring circuit 56 configures the waveguide core using an algorithm that maximizes the amount of light transmitted from one optical component 14 to another. For example, one algorithm may be used that models a straight waveguide core extending from the end of the light-guiding portion 20 of one optical component 14 to the end of the light-guiding portion 20 of the other component. An alternative algorithm may be used in which the waveguide configuring circuit 56 models a waveguide core having sections that start in the direction of the beams of light entering or leaving each of the optical components 14 and configures a curved middle section having maximum radii of curvature that connects the outer sections. The curved middle section may be configured as an S-shaped middle section 42 as shown in FIG. 11, as in the case of the misalignment shown in FIG. 10, or as a C-shaped middle section 48 as shown in FIG. 13, as in the case of the misalignment shown in FIG. 12.

When the waveguide configuring circuit 56 has determined a configuration of a waveguide core, the waveguide core is formed. Configuration signals are transmitted to a laser controller 58, which controls a laser 60 to create a waveguide core pattern according to the configuration determined by the waveguide configuring circuit 56. The laser controller 58 and laser 60 may be replaced by an alternative waveguide core forming apparatus, such as an apparatus for directing an electron beam at portions of the waveguide layer 22. In addition, the waveguide core forming apparatus operates according to the material that is applied as the waveguide layer 22. For instance, when the waveguide layer 22 constitutes a transparent layer, the laser 60 removes the unwanted portions of the waveguide layer 22 using a technique such as laser ablation. In the example in which the waveguide layer 22 constitutes a photosensitive layer, the laser controller 58 controls the laser 60 to direct light toward the portions of the waveguide layer 22 that are to become the waveguide core. Since the exposed portions of the photosensitive layer become transparent, the exposed portions create the light-guiding portion of the waveguide. The portions that are not exposed remain opaque.

Other techniques may be used to form the waveguide core according to the configuration created by the waveguide configuring circuit 56. For example, a photoresist layer and a mask defined by waveguide configuring circuit 56 may be formed on the waveguide layer 22. Using known pattern forming methods, the photoresist layer and mask are used to define the shape of the waveguide core.

The image recognition circuit 54 and waveguide modeling circuit 56 can be implemented in hardware, software, firmware, or a combination thereof. In the disclosed embodiments, the image recognition circuit 54 and waveguide modeling circuit 56 are implemented in software or firmware that is stored in a memory and that is executed by a suitable instruction execution system. If implemented in hardware, as in an alternative embodiment, the image recognition circuit 54 and waveguide modeling circuit 56 can be implemented with any or a combination of the following technologies, which are all well known in the art: a discrete logic circuit having logic gates for implementing logic functions upon data signals, an application specific integrated circuit (ASIC) having appropriate combinational logic gates, a programmable gate array (PGA), a field programmable gate array (FPGA), etc.

Figure 15:
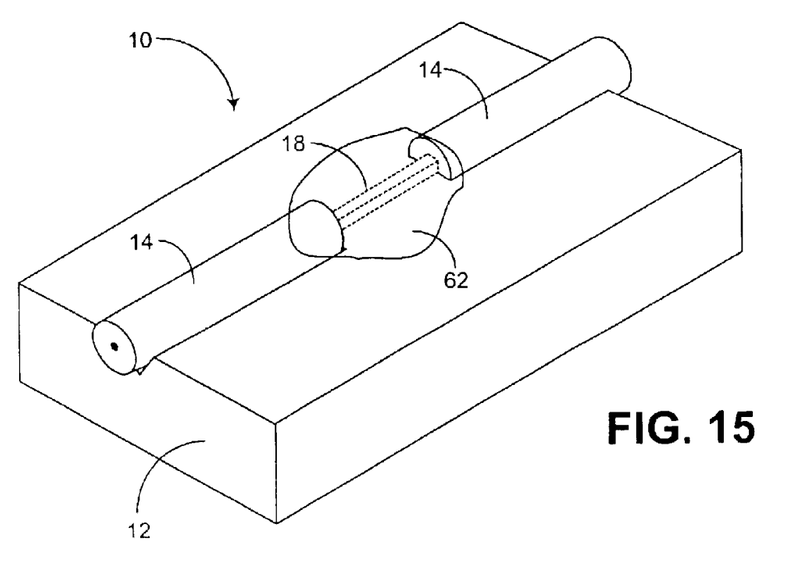
FIG. 15 is a perspective view illustrating the optical module embodiment of FIG. 1 and further comprising a protective cladding material.

FIG. 15 is a perspective view of the optical module 10 with the waveguide core 18 located on the substrate 12. In addition to the waveguide core 18, a cladding material 62 is applied. The cladding material 62 may be applied to cover the waveguide core 18 as well as a portion of the ends of the optical components 14. The cladding material 62 comprises a material having a refractive index lower than the refractive index of the waveguide core 18 to enhance the guiding of light through the waveguide core 18. Furthermore, the cladding material 62 protects the waveguide core 18 from external influences. With the optical module 10 as defined herein, methods for aligning optical components are now explained.

Figure 16:
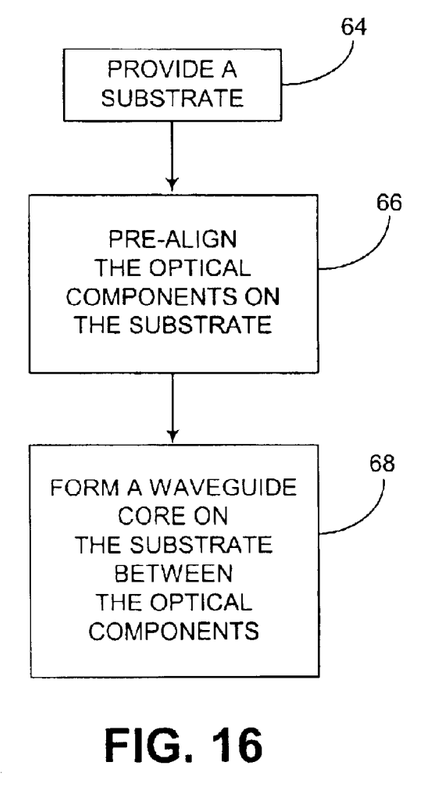
FIG. 16 is a flow chart illustrating an exemplary embodiment of a method in accordance with the present invention for aligning optical components in an optical module.

FIG. 16 is a flow chart showing an exemplary method in accordance with the present invention for aligning two optical components. In block 64, a substrate having at least one groove is provided. In block 66, the optical components are pre-aligned on the substrate. Pre-alignment involves positioning the optical components within the groove or grooves such that the light-guiding portions of the optical components are coarsely aligned with each other. In block 68, a waveguide core is formed on the substrate. The waveguide core is formed between the optical components such that light is guided by the waveguide core, maximizing the amount of light energy transmitted from one optical component to the other.

Figure 17:
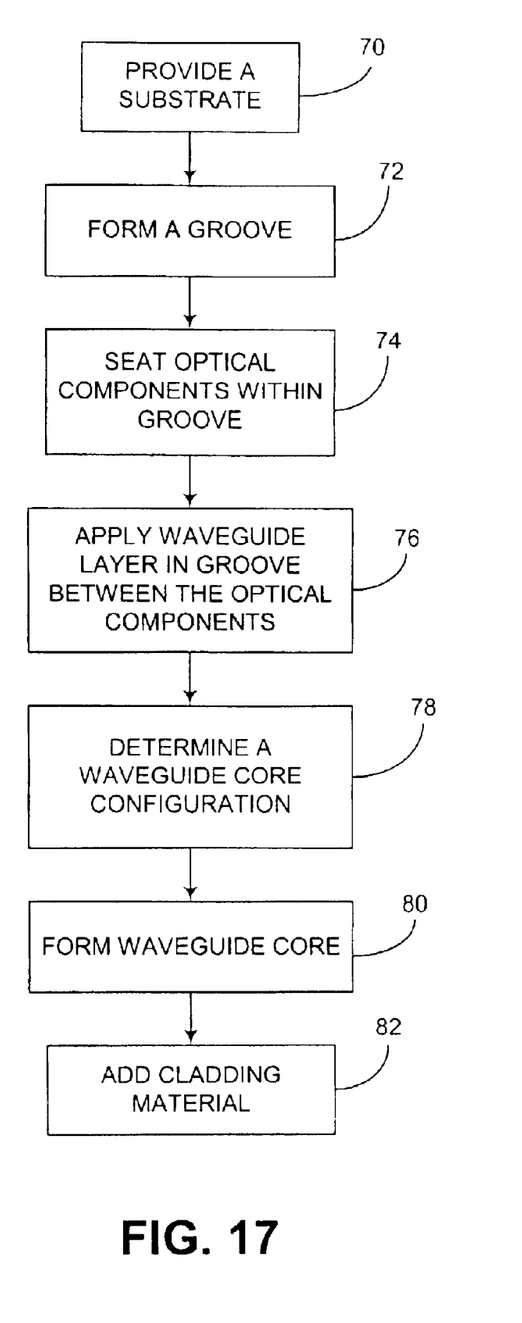
FIG. 17 is a flow chart illustrating an embodiment of a method for aligning optical components in an optical module having a substrate with one groove.

FIG. 17 is a flow chart illustrating a detailed embodiment of a method for aligning optical components in an optical module. In block 70, a substrate is provided. In block 72, a single groove is formed in the substrate. After the groove is formed in the substrate, the optical components are seated within the groove, as indicated in block 74. The seating of the optical component may further include the process of affixing the components within the groove.

In block 76, a waveguide layer is applied in the groove between the optical components. Different materials may be applied as the waveguide layer. One material that may be applied is a layer of a material that has a material that effectively conducts light. Another material that may be applied is a photosensitive layer that has a refractive index that changes when exposed to light. Layers of a photoresist and a mask may be applied as the waveguide layer.

Before the waveguide layer is applied, it may be desirable to add a shallow layer to a bottom portion of the groove. The shallow layer acts as a pedestal layer on which the waveguide layer rests. Thus, when the waveguide layer is applied, the shallow layer supports the waveguide layer at a level such that the waveguide layer is adjacent to the light-guiding portions of the optical components. With the optical components seated within the single groove and the waveguide layer formed between the optical components, flow proceeds to block 78.

In block 78, the configuration of a waveguide core is determined. The waveguide core configuration may be determined from images of a region of the optical module using a waveguide core customization algorithm. In block 80, the waveguide core is formed from the waveguide layer based on the waveguide core configuration determined in block 78. If the waveguide layer is a transparent layer, the forming procedure may include etching, laser ablation, or other suitable material-removing technique. If the waveguide layer is a photosensitive layer, a pattern of light may be emitted on the photosensitive layer to form the waveguide core. If the waveguide layer is a photoresist, portions of the waveguide layer may be exposed through a mask defined in block 78 and developed according to known manufacturing techniques. In block 82, a cladding material is added.

Figure 18:
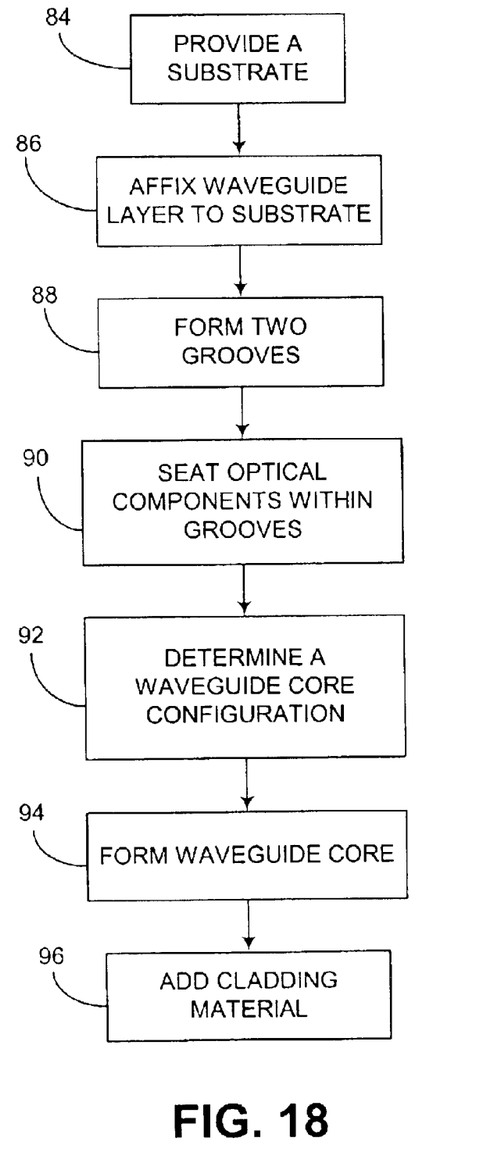
FIG. 18 is a flow chart illustrating an embodiment of a method for aligning optical components in an optical module having a substrate with two grooves.

FIG. 18 is a flow chart illustrating a detailed embodiment of a method for aligning optical components in an optical module having two grooves. In block 84, a substrate is provided. In block 86, a waveguide layer is affixed to the substrate. The waveguide layer may be a transparent layer that conducts light or a photosensitive layer whose index of refraction changes when exposed to light, for example. In block 88, two grooves are formed in the substrate and waveguide layer. In block 90, the optical components are pre-aligned by seating the optical components in the grooves. The process of seating the optical components may further include affixing the optical components in the grooves by any suitable affixing process, e.g. gluing, soldering, etc.

In block 92, the configuration of a waveguide core is determined. The waveguide core configuration may be determined from images of a region of the optical module. Using a waveguide core customization algorithm, for example, the images may be analyzed to determine the configuration of the waveguide core. In block 94, the waveguide core is formed from the waveguide layer based on the waveguide core configuration determined in block 92. If the waveguide layer is a transparent layer, the forming procedure may include etching, laser ablation, or other suitable material-removing technique. If the waveguide layer is a photosensitive layer, a pattern of light may be emitted on the photosensitive layer to form the waveguide core. If the waveguide layer is a photoresist, portions of the photoresist may be exposed through a mask defined in block 92. The photoresist is then developed according to known manufacturing techniques to remove all but the waveguide core. In block 96, a cladding material is added.

Figure 19:
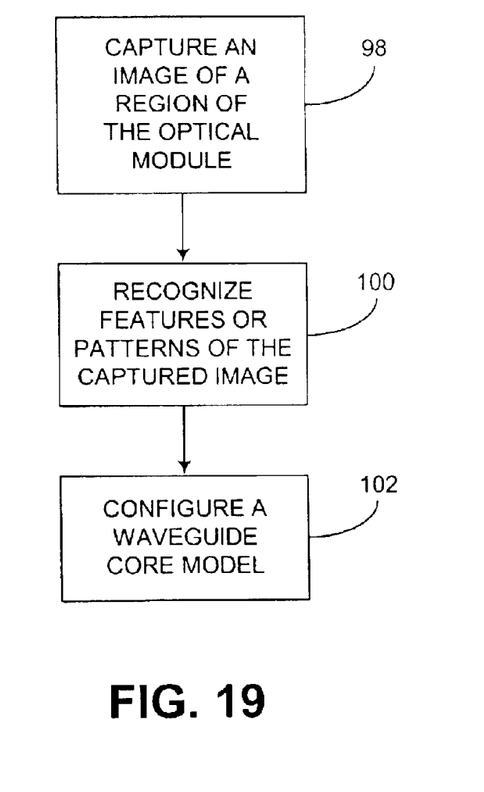
FIG. 19 is a flow chart illustrating an embodiment of a method for determining a waveguide core configuration.

FIG. 19 is a flow chart of an exemplary method for performing block 78 shown in FIG. 17 or block 92 shown in FIG. 18, in which the waveguide core configuration is determined. In block 98, an image of a region of the optical module is captured. Preferably, the region includes at least the gap between the two optical components. The region may additionally include portions of the ends of the optical components. The detected image may be an image of the optical components, light transmitted between the optical components, or alignment marks on the optical components. The detected image may include physical features of the optical components such as outer peripheral portions and/or markings on the outside of the optical components. Alternatively, the detected image may include light transmitted from each of the optical components, when the light is transmitted from one optical component at a time. Another alternative may include detecting physical features of one optical component and detecting light patterns emitted from another optical component.

In block 100, features or portions of the captured image are recognized to extract significant features that may help in defining a waveguide configuration that efficiently and effectively transmits light from one optical component to another. After recognizing portions of the detected image, the procedure shown in block 102 is performed in which the waveguide core configuration is determined. A custom algorithm may be used to determine the waveguide core configuration from the features recognized in block 100.

It should be emphasized that the above-described embodiments of the present invention are merely examples of possible implementations, set forth for a clear understanding of the principles of the invention. Many variations and modifications may be made to the above-described embodiments of the invention without departing from the principles of the invention. All such modifications and variations are intended to be included herein within the scope of this disclosure and protected by the following claims.

We claim:

1. A method for optically aligning optical components in an optical module, the method comprising:

providing a substrate;

pre-aligning the optical components with respect to the substrate with a gap therebetween;

electronically receiving an image signal representing an image of a region of the optical module;

processing the image signal to recognize patterns of the image of the region;

configuring a waveguide core model from the recognized patterns; and forming a waveguide core based on the waveguide core model, the waveguide core supported by the substrate, and extending across the gap from one optical component to another.

2. The method of claim 1, wherein the pre-aligning comprises:

forming a groove in the substrate; and positioning the optical components in the groove such that light-guiding portions of the optical components are coarsely aligned with each other.

3. The method of claim 1, wherein the providing further comprises providing a substrate having a groove.

4. The method of claim 1, wherein the pre-aligning comprises:

creating two grooves in the substrate;

positioning the optical components in the grooves; and affixing the optical components within the grooves.

5. The method of claim 1, wherein receiving the image signal further comprises capturing an image of physical features of the region, and processing the image signal further comprises recognizing the physical features of the captured image.

6. The method of claim 5, wherein the recognizing physical features comprises recognizing physical dimensions of the external topology of the optical components and recognizing the location of the end portions of the optical components.

7. The method of claim 5, wherein the recognizing physical features comprises recognizing markings on the outer surfaces of the optical components.

8. The method of claim 1, wherein receiving the image signal further comprises capturing an image of light patterns transmitted from at least one of the optical components, and processing the image signal further comprises recognizing the light patterns of the captured image.

9. The method of claim 1, wherein receiving the image signal further comprises capturing an image of the physical features of a first optical component and capturing an image of light patterns emitted from a second optical component, and wherein processing the image signal further comprises recognizing the physical features of the first optical component and recognizing light patterns emitted from the second optical component.

10. The method of claim 1, wherein the forming further comprises:
applying a transparent waveguide layer to the surface of the substrate; and
removing portions of the waveguide layer that are outside of the waveguide core model.

11. The method of claim 10, wherein the forming further comprises applying a cladding material over the waveguide layer.

12. The method of claim 1, wherein the forming further comprises:
applying a photosensitive layer to the surface of the substrate; and
exposing portions of the photosensitive layer in accordance with the waveguide core model.

13. An optical module comprising:
a substrate;
two grooves formed in the surface of the substrate, each groove having an alignment face orthogonal to a long axis of the groove;
optical components seated in the grooves;
a waveguide core formed on the substrate, the waveguide core having a curved shape extending from a light-guiding portion of one optical component to a light-guiding portion of another optical component.

14. The optical module of claim 13, wherein the substrate comprises a material selected from a group consisting of plastic, glass, ceramic, and silicon.

15. The optical module of claim 13, wherein each groove has a V-shaped cross-section.

16. The optical module of claim 13, wherein each groove has a shape that conforms to at least part of the shape of the optical components.

17. The optical module of claim 13, further comprising a cladding material that enhances light guiding in the waveguide core.

18. A method for manufacturing an optical module, the method comprising:
providing a substrate;
applying a waveguide layer to a surface of the substrate;
forming at least one groove in the substrate;
seating two optical components in the at least one groove with a gap therebetween; and
creating a waveguide core from the waveguide layer based on the position and orientation of light-guiding portions of the seated optical components, the waveguide core configured to transmit light from one of the optical components to the other.

19. The method of claim 18, wherein the applying comprises applying a waveguide layer having a thickness at least as great as the size of the light-guiding portions of the optical components.

20. The method of claim 18, wherein the applying comprises applying a transparent waveguide layer.

21. The method of claim 18, wherein the creating comprises removing unwanted portions of the transparent waveguide layer.

22. The method of claim 18, wherein applying comprises applying a photosensitive waveguide layer.

23. The method of claim 22, wherein the creating comprises exposing waveguide portions of the photosensitive waveguide layer to light.

24. The method of claim 18, wherein the forming comprises etching a single groove, and the applying further comprises applying a waveguide layer within the groove between the optical components.

25. The method of claim 18, wherein the forming comprises etching two axially-aligned grooves.

26. The method of claim 18, wherein the creating further comprises:
capturing an image of physical features of the optical components;
recognizing physical dimensions of the external topology of the optical components from the captured image; and
recognizing the location of the end portions of the optical components from the captured image.

27. The method of claim 18, wherein the creating further comprises:
capturing an image of physical features of the optical components; and
recognizing markings on the outer surfaces of the optical components.

28. The method of claim 18, wherein the creating further comprises:
capturing an image of light patterns transmitted from the optical components; and
recognizing the light patterns of the captured image.

* * * * *